United States Patent Office 3,272,825
Patented Sept. 13, 1966

3,272,825
METHOD OF PRODUCING PYRIDINE
Akira Shimizu, Hirakata, Kiyonori Igarashi, Joto-ku, Osaka, and Junichi Hashimoto, deceased, late of Joto-ku, Osaka, Japan, by Shigako Hashimoto, executor, Shimizu, Japan, assignors to Koei Chemical Co., Ltd., Doshomachi, Higashi-ku, Osaka, Japan
No Drawing. Filed Dec. 9, 1963, Ser. No. 329,617
Claims priority, application Japan, Dec. 13, 1962, 37/56,921
5 Claims. (Cl. 260—290)

This invention relates to a method for the production of pyridine, and more particularly to an improved method for the production of pyridine while minimizing the by-production of other pyridine bases, i.e. 2-picoline, 3-picoline and 4-picoline.

Pyridine is an important chemical as a raw material for the production of various pharmaceuticals such as sulfonamides, antihistamines, etc. and other useful chemical products such as synthetic resins, surfactants, etc. Pyridine is also useful as a basic solvent and as a catalyst in certain organic reactions. Other uses and applications of pyridine are well known in the art.

So far, pyridine bases have been produced as by-products of coal-tar industry. However, the coal-tar industry is insufficient in its productive capacity to satisfy the increasing demand for pyridine.

Various methods have been proposed to chemical synthesize pyridine bases. Thus, it has been proposed to produce pyridine and 3-picoline by a catalytic reaction of formaldehyde, acetaldehyde and ammonia in a vapor phase at an elevated temperature. However, there has been known or proposed no satisfactory method to produce pyridine in a selectively high yield while minimizing the by-production of picolines.

In British Patent No. 790,994 published on February 19, 1958, there is disclosed that pyridine and 3-picoline are produced by reacting formaldehyde, acetaldehyde and ammonia over a silica-alumina (15% alumina) catalyst comprising an oxide of a metal having a valency of 3 or 4, in the vapor state at a temperature ranging from 400° C. to 500° C. British Patent No. 816,973 published on July 22, 1959, also discloses that pyridine and 3-picoline are produced by reacting formaldehyde, acetaldehyde and ammonia in the presence of methanol and of a catalyst which is useful in the production of 2- and 4-picolines from acetylene and ammonia, and that the proportion of acetaldehyde to be used should not be greater than 2 moles per mole of formaldehyde. However, in these known methods, the yield of pyridine is not satisfactorily high because of the by-production of 3-picoline.

Therefore, an object of this invention is to provide a novel method for producing pyridine in a high yield.

Another object of this invention is to provide a novel method for producing pyridine in a high yield and in a pure state by a catalytic vapor phase reaction of formaldehyde, acetaldehyde and ammonia.

Still another object of this invention is to provide a novel method for producing pyridine in a high yield while minimizing the formation of other pyridine bases or picolines, by a catalytic vapor phase reaction of formaldehyde, acetaldehyde and ammonia.

Other objects, advantages and features of this invention will be apparent from the following description.

We have found, after studying the production of pyridine bases by catalytic vapor phase reaction of aldehydes and ammonia, that there can be obtained a mixture of pyridine bases wherein pyridine predominates and the content of by-products or picolines is substantially small, if a particular amount of acetaldehyde is employed in respect of formaldehyde.

Thus, the present invention provides a method for producing pyridine which comprises contacting a gaseous reaction mixture of formaldehyde, acetaldehyde and ammonia at an elevated temperature with a catalyst, said reaction mixture containing more than 2.0 moles and less than 5.0 moles of acetaldehyde per mole of formaldehyde.

In carrying out the method of this invention, any catalyst and any reaction condition known in the art of the production of pyridine bases by vapor phase catalytic reaction involving the use of aldehyde(s) and ammonia as reactants may be used, except that the particular molar ratio of acetaldehyde to formaldehyde is the most important feature of this invention.

Thus a gaseous mixture of formaldehyde, acetaldehyde and ammonia may be continuously introduced in a reaction containing or filled with a catalyst and maintained at an elevated temperature.

Various types of catalyst in the reactor may be used including fixed bed type, moving bed type and fluidizing bed type. As mentioned above the catalyst may be any known per se in the art. Examples of useful catalysts are silica, alumina, silica-alumina, silica-magnesia, etc. among which silica-alumina is preferred. The content of alumina in the silica-alumina catalyst may vary over a wide range although a silica-alumina catalyst containing 5–25% by weight of alumina is preferable. It is also preferable to combine a suitable co-catalyst with the above mentioned main catalysts such as silica-alumina. Examples of useful co-catalysts are metals of the second, third, fourth and eighth groups of Mendeleev's Periodic Table and oxides of these metals. Practically, at least one of Zn, Cd, Th, Co and oxides thereof may be used as the co-catalyst. The amount of the co-catalyst may be in an amount of 0.1 to 15% by weight based upon the total weight of the catalyst.

The addition of the co-catalyst to the main catalyst, e.g. silica-alumina may be conducted by a conventional manner such as co-precipitation or impregnation. For example, a catalyst useful in the present invention may be prepared by the following method. To a silica gel, newly prepared from sodium silicate by addition of an acid, an aqueous solution of a salt of aluminum and a salt of cadmium or zinc, such as nitrate, sulfate of chloride, is added. To the so-formed mixture is added an alkali such as an aqueous solution of ammonia while stirring, to co-precipitate the aluminum and cadmium or zinc in the form of hydroxide on the silica. The mass is then washed with water to remove any water-soluble material and then molded, dried and calcinated. The catalyst thus prepared, when used in the condition of the present invention, retains its activity for tens of hours, and the regeneration of the spent catalyst is easily carried out by passing hot air to the catalyst bed to burn away carbon and organic substances deposited on the surface of the catalyst.

The gaseous reactants, i.e. formaldehyde, acetaldehyde and ammonia may be mixed together. Alternatively, formaldehyde gas and acetaldehyde gas are mixed and the mixture is then mixed with gaseous ammonia. The mixing of the reactants may preferably be conducted prior to the introduction to the reaction zone. The gaseous mixture may preferably be preheated nearly to the reaction temperature. In any case the aldehydes and ammonia should be mixed or contacted after both have been preheated separately at least to about 250° C. If aldehydes and ammonia are contacted together at a temperature lower than 250° C. they will form adducts which would block the reactor and consequently prevent the reactant gas from flowing through the reactor.

The temperature in the reaction zone may vary within the range from 400° C. to 550° C., more preferably 430° C. to from 480° C.

The contacting time of the gaseous reaction mixture may be within the range of from 0.1 to 7 seconds (space velocity, 36,000 hrs.$^{-1}$ to 514 hr.$^{-1}$).

Generally the reaction is carried out under ordinary or atmospheric pressure, but it may be carried out under somewhat super-atmospheric or sub-atmospheric pressure if desired or necessary.

The effluent gas discharged from the reactor after the reaction may be treated in a conventional manner to recover the desired pyridine bases. Thus, for example, the discharged gaseous product is condensed, and the oily layer is separated and dried over a dryer such as solid alkali hydroxide, and then distilled fractionally to obtain pyridine in pure state.

As the reactant formaldehyde, not only formaldehyde but also any substance such as formaline (an aqueous formaldehyde solution), paraformaldehyde, trioxane, methylal, methyl hemiformal or a mixture of two or more of them which can generate formaldehyde under the reaction condition may be used. Similarly, as the reactant acetaldehyde, not only acetaldehyde but also any substance such as paraldehyde or a mixture of acetaldehyde and paraldehyde which can generate acetaldehyde under the reaction conditions may be used. Therefore, it should be understood that the term "formaldehyde" and the term "acetaldehyde" as used in this specification and claims refer not only to the respective aldehydes but also to aldehyde generating substances exemplified above.

The ammonia content in the reaction mixture may vary over a wide range, e.g. from 0.5 mole to 10 moles inclusive, preferably 1 to 1.5 moles, per mole of total aldehydes.

As mentioned before, the important feature of this invention is in the particular molar ratio of acetaldehyde to formaldehyde in the reaction mixture, because the invention is directed solely to the production of pyridine and is based upon the finding that the molar ratio of acetaldehyde to formaldehyde definitely affect the yield of pyridine along with the minimization of the formation of by-products or picolines as will be seen in the examples illustrated hereinafter.

Thus, according to the present invention, acetaldehyde must be used in an amount of more than 2.0 moles but less than 5.0 moles per mole of formaldehyde. Preferably the amount of acetaldehyde is 2.2–3.5 moles, more preferably 2.3–2.8 moles per mole of formaldehyde.

In order to illustrate the present invention but not to limit the same, the following examples are given. Throughout the examples, each yield of pyridine and picolines was based upon the carbon contained in the charged aldehydes and assuming that other bases had not been produced. More precisely speaking the yield of pyridine was calculated assuming that where all carbon contained in the charged aldehydes serves to contitute pyridine and not to constitute picolines the pyridine yield is theoretically 100%. The same is applied to each of picolines.

*Example 1*

An aqueous solution containing 37% aqueous formaldehyde solution (formaline) and acetaldehyde at the mole ratio of 2.5 moles of acetaldehyde per one mole of formaldehyde was vaporized at the rate of 3.2 grams per minute, and preheated to a temperature of about 250° C. On the other hand ammonia gas was flowed at the rate of 0.8 litre per minute at ordinary temperature and pressure, and preheated to a temperature of about 250° C. Then both gas streams were mixed and passed through a catalyst bed containing 350 cc. of silica-alumina catalyst consisting of 82% silica, 15% alumina and 3% zinc oxide. The temperature of the catalyst layer was kept at 435° C. during the reaction. The effluent gas mixture of product and unreacted material out of the reactor was cooled to condense. To the condensed liquid was added solid sodium hydroxide to isolate dried crude pyridine bases (greenish grey oily products). The crude pyridine bases were fractionally distilled with carefulness to separate pyridine, 2-picoline and mixture of 3- and 4-picolines. The yield and purity of each of thus obtained pyridine bases were as follows: pyridine, yield 38.2% (purity 98%); 2-picoline, yield 6.5% (purity 98%); mixture of 3- and 4-picolines, yield 12.5% (composition: 3-picoline 66%, 4-picoline 34%).

*Example 2*

A series of experiments was carried out in the same manner as in Example 1 except that some conditions were varied as shown in the following tables which also show the results of these experiments.

| Run No. | Kind and mole ratio of reactant | | | | | | | Catalyst |
|---|---|---|---|---|---|---|---|---|
| 1 | Formaldehyde | 1 mole | Acetaldehyde | 1.4 mole | Ammonia | 1.9 mole | | SiO$_2$:Al$_2$O$_3$:ZnO |
| 2 | do | do | do | 2.0 mole | do | 2.5 mole | | SiO$_2$:Al$_2$O$_3$:ZnO |
| 3 | do | do | do | 2.3 mole | do | 2.8 mole | | SiO$_2$:Al$_2$O$_3$:ZnO |
| 4 | do | do | do | 2.5 mole | do | 2.1 mole | | SiO$_2$:Al$_2$O$_3$:ZnO |
| 5 | do | do | do | do | do | 3 mole | | SiO$_2$:Al$_2$O$_3$:ZnO |
| 6 | do | do | do | 2.8 mole | do | 3.3 mole | | SiO$_2$:Al$_2$O$_3$:ZnO |
| 7 | do | do | do | 3.5 mole | do | 4 mole | | SiO$_2$:Al$_2$O$_3$:ZnO |
| 8 | do | do | do | 5.0 mole | do | 5.5 mole | | SiO$_2$:Al$_2$O$_3$:ZnO |
| 9 | do | do | do | 7.0 mole | do | 7.5 mole | | SiO$_2$:Al$_2$O$_3$:ZnO |
| 10 | do | do | do | 2.5 mole | do | 3 mole | | SiO$_2$:Al$_2$O$_3$:CdO |
| 11 | Trioxane | do | Paraldehyde | 2.5 mole | do | 9 mole | | SiO$_2$:Al$_2$O$_3$:ZnO |

| Run No. | S.V., hr.$^{-5}$ | Reaction temperature, °C. | Pyridine yield, percent | Picoline yield, percent | | |
|---|---|---|---|---|---|---|
| | | | | 2-picoline | 3-picoline | 4-picoline |
| 1 | 627 | 450 | 21.5 | 2.5 | 13.2 | 1.6 |
| 2 | 735 | 440 | 30.4 | 5.0 | 11.3 | 2.8 |
| 3 | 788 | 440 | 35.4 | 5.7 | 9.5 | 3.4 |
| 4 | 740 | 435 | 38.2 | 6.5 | 8.3 | 4.2 |
| 5 | 590 | 440 | 38.6 | 6.3 | 8.2 | 4.2 |
| 6 | 627 | 440 | 34.7 | 7.5 | 7.0 | 6.8 |
| 7 | 718 | 440 | 30.6 | 11.9 | 5.8 | 8.5 |
| 8 | 910 | 440 | 26.6 | 13.1 | 1.7 | 12.2 |
| 9 | 870 | 440 | 18.0 | 16.8 | 0.8 | 14.6 |
| 10 | 590 | 450 | 38.0 | 6.2 | 8.1 | 4.8 |
| 11 | 875 | 440 | 38.4 | 6.3 | 8.2 | 4.1 |

What we claim is:

1. In a process for producing pyridine by heating a gaseous reaction mixture of formaldehyde, acetaldehyde and ammonia in the presence of a pyridine catalyst selected from the group consisting of silica, alumina, silica/alumina, and silica/magnesia, the improvement wherein the amount of acetaldehyde in the reaction mixture is from 2.2 to 3.5 moles per mole of formaldehyde.

2. The process according to claim 1 wherein the catalyst is silica/alumina which is combined with a co-catalyst selected from the group consisting of Zn, Cd, Th, Co, and oxides thereof.

3. The process according to claim 1 wherein the molar ratio of ammonia to the total aldehyde content is from 1 to 1.5.

4. The process according to claim 1 wherein the reaction temperature is from 400° C. to 550° C.

5. The process according to claim 1 wherein the reaction temperature is from 430° C. to 480° C.

References Cited by the Examiner

UNITED STATES PATENTS 2,700,042  1/1955  Aries _____ 260—290

FOREIGN PATENTS 742,643  12/1955  Great Britain.
790,994  2/1958  Great Britain.
900,799  7/1962  Great Britain.

WALTER A. MODANCE, *Primary Examiner.*

NICHOLAS S. RIZZO, JOHN D. RANDOLPH, MARION W. WESTERN, ALAN L. ROTMAN,
*Assistant Examiners.*